(12) United States Patent
Rowe et al.

(10) Patent No.: US 10,099,726 B2
(45) Date of Patent: Oct. 16, 2018

(54) PATCH WELDED BLANK ON AN A-PILLAR

(71) Applicant: Ford Global Technologies, LLC, Dearborn, MI (US)

(72) Inventors: Nicholas Rowe, Plymouth, MI (US); Armando Zuniga, Metepec (MX); Alejandro Eli Acosta Flores, Toluca (MX); Omar Fragoso Medina, Ciudad de Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/358,697

(22) Filed: Nov. 22, 2016

(65) Prior Publication Data

US 2018/0141589 A1 May 24, 2018

(51) Int. Cl.
*B62D 21/15* (2006.01)
*B62D 25/04* (2006.01)

(52) U.S. Cl.
CPC ............ *B62D 25/04* (2013.01); *B62D 21/15* (2013.01)

(58) Field of Classification Search
CPC ................................ B62D 21/15; B62D 25/04
USPC ..................................................... 296/193.06
See application file for complete search history.

(56) References Cited

U.S. PATENT DOCUMENTS

| | | | | |
|---|---|---|---|---|
| 6,170,906 B1 * | 1/2001 | Kasuga | ................ | B62D 25/082 296/203.02 |
| 6,705,668 B1 * | 3/2004 | Makita | .................. | B62D 21/15 296/187.03 |
| 7,445,269 B2 * | 11/2008 | Yustick | ................ | B62D 21/157 296/187.01 |
| 9,744,997 B2 * | 8/2017 | Olofsson | ................ | B62D 25/04 |
| 2004/0201253 A1 * | 10/2004 | Kitagawa | ................ | B62D 21/15 296/187.03 |
| 2009/0250967 A1 | 10/2009 | Bodin | | |
| 2010/0201158 A1 * | 8/2010 | Miyashita | .............. | B21D 53/88 296/193.01 |
| 2014/0028056 A1 * | 1/2014 | Nishimura | ............. | B62D 25/04 296/193.06 |
| 2015/0210320 A1 * | 7/2015 | Olofsson | ................ | B62D 25/04 428/598 |
| 2015/0314363 A1 | 11/2015 | Nelson et al. | | |
| 2016/0016610 A1 * | 1/2016 | Okada | .................... | B23K 26/22 219/121.64 |
| 2016/0200371 A1 * | 7/2016 | Inamoto | ................. | B62D 25/04 296/203.01 |

(Continued)

FOREIGN PATENT DOCUMENTS

| | | |
|---|---|---|
| CN | 105644628 A | 6/2016 |
| DE | 102010060702 A1 | 5/2012 |

(Continued)

*Primary Examiner* — Gregory A Blankenship
(74) *Attorney, Agent, or Firm* — Jason C. Rogers; Brooks Kushman P.C.

(57) ABSTRACT

A body for a vehicle includes an A-pillar defining a C-channel along a first surface of the A-pillar. The body further includes a support disposed within the C-channel and defining a shape matching the C-channel to mate the support along an entirety of the first surface via pre-formed spot welds aligned with the first surface. The welds are defined along a single plane being parallel to the first surface, wherein the welds are spaced to secure the support within the C-channel to form flush contact between the support and the first surface.

8 Claims, 3 Drawing Sheets

(56) References Cited

U.S. PATENT DOCUMENTS

2017/0008124 A1* 1/2017 Fujimoto .............. B23K 26/244
2017/0101133 A1* 4/2017 Emura ................... B62D 25/04

FOREIGN PATENT DOCUMENTS

| JP | 2001278112 A | 10/2001 |
| JP | 2008114728 A | 5/2008 |
| JP | 2016078731 A | 5/2016 |
| KR | 20110050995 A | 5/2011 |

* cited by examiner

PATCH WELDED BLANK ON AN A-PILLAR

TECHNICAL FIELD

The disclosure relates to a support for stiffening an A-pillar of a vehicle.

BACKGROUND

Vehicle bodies use structural members to provide support and rigidity to the vehicle allowing for operation of the vehicle. For example, a vehicle may use an A-pillar to provide support between a door and a windshield. Extending between the door and the windshield, the A-pillar is an important structural member. The A-pillar may aid in determining the interior space used for the cockpit. The A-pillar constrains the interior space of the cockpit by supporting the windshield and giving structural integrity to the vehicle to allow the vehicle doors to open and close. The A-pillar may further aid to prevent intrusion into the cockpit by providing support and stiffness of the vehicle body. The A-pillar prevents intrusion by withstanding forces that may cause buckling of the A-pillar during operation of the vehicle.

SUMMARY

A structural member for a vehicle includes an A-pillar having a first surface defining a C-channel, and a support. The support has a shape that matches the C-channel such that the support is flush with the first surface along an entirety of the first surface. The support is attached to the first surface via pre-formed spot welds disposed at regular intervals along the entirety in a plane defined parallel to the first surface.

A vehicle includes a body and a support. The body includes an A-pillar having a first surface defining a C-channel. The support is disposed on the body. The support is aligned and in contact with the C-channel such that the support defines a shape that matches a shape of the first surface and extends along an entirety of the first surface. The support is attached to the A-pillar via pre-forming spot welds along the entirety of the first surface within a single plane being parallel to the first surface.

A body for a vehicle includes an A-pillar defining a C-channel along a first surface of the A-pillar. The body further includes a support disposed within the C-channel and defining a shape matching the C-channel to mate the support along an entirety of the first surface via pre-formed spot welds aligned with the first surface. The welds are defined along a single plane being parallel to the first surface, wherein the welds are spaced to secure the support within the C-channel to form flush contact between the support and the first surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
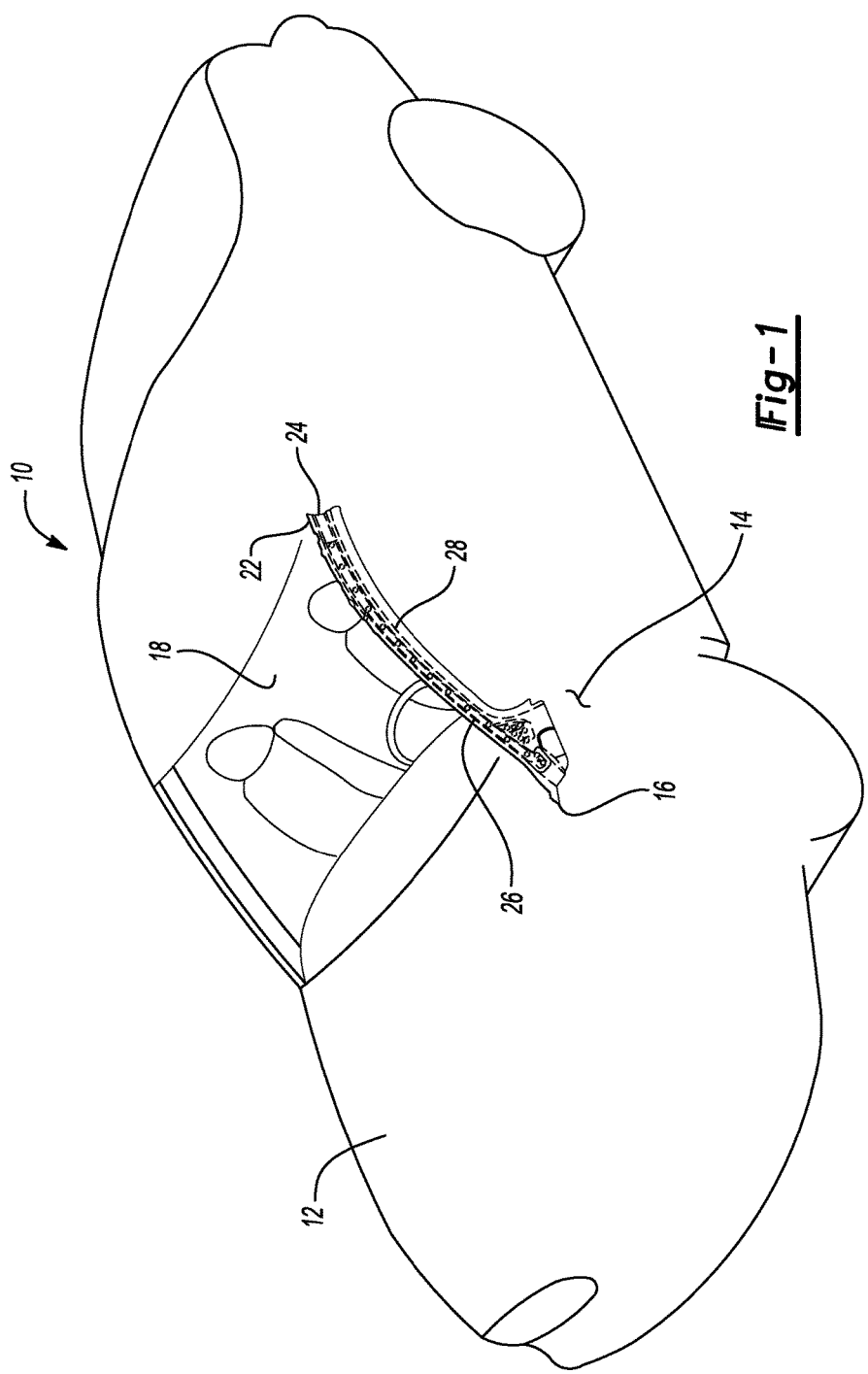
FIG. 1 is a perspective view of a vehicle having structural pillars.

FIG. 1 depicts a perspective view of a vehicle 10. The vehicle 10 includes a body 12 comprising a plurality of structural members 14. The structural members 14 may be the components that constrain the body panels (not shown), for example the A-pillar 16. The structural members 14 may also include the B-pillar, the C-pillar, the D-pillar or any other load supporting structural member 14 of the body 12 of the vehicle 10. The structural members 14 may be subject to various loading characteristics during operation of the vehicle 10. For example, during vehicle travel, noise, vibrations and harshness may be transferred through the structural members 14. Therefore, the structural members 14 may be configured to absorb the loads through the structural members 14 such that the body 12 maintains rigidity and stiffness. Specifically, during a small overlap rigid barrier impact, maintaining stiffness and rigidity of the A-pillar 16 is important to reduce intrusion into the cabin 18 of the vehicle 10.

However, packaging constraints on the A-pillar 16 may make reinforcing the A-pillar 16 difficult. One method of adding stiffness to the A-pillar 16 is to increase the thickness of the weld flange 22. The A-pillar 16, may, therefore, define a C-channel 24. Due to the C-channel 24 formation of the A-pillar 16, reinforcement packaging is not possible. For example, the packaging constraints of the A-pillar 16 limit increasing the thickness of the weld flange 22 of the C-channel 24 defined on the A-pillar 16. The A-pillar 16 may be further reinforced without increasing the thickness of the weld flange 22. The A-pillar 16 may further include a support 26 disposed within the C-channel 24 and welded to the C-channel 24. As will be described in more detail below, the support 26 may be configured to add stiffness and rigidity to the A-pillar 16 by reinforcing the C-channel 24 defined on the A-pillar 16.

Again, the support 26 may be welded to the A-pillar 16 within the C-channel 24. In at least one other embodiment, the support 26 may be bonded, adhered, or fastened within the C-channel 24 of the A-pillar 16. The support 26 may be welded with the C-channel 24 of the A-pillar 16 using a plurality of welds 28. The plurality of welds 28 may extend perpendicular to the support 26 and the C-channel 24 to interconnect the support 26 and the C-channel 24. As stated above, packaging constraints may limit attachment of the support 26 to the C-channel 24 of the A-pillar 16. After formation of the A-pillar 16, the plurality of welds 28 may be difficult to access. Therefore, the plurality of welds 28 requires spot welding pre-forming in order to use the welds 28 to attach the support 26 within the C-channel 24 of the A-pillar 16. Further, the plurality of welds 28 may be configured to maintain the support 26 within the C-channel 24 of the A-pillar 16 during a stamping process used to form the A-pillar 16. For example, the plurality of welds 28 may be subjected to shearing forces during the stamping process used to form the A-pillar 16. To account for the weld shearing, the plurality of welds 28, as will be described in more detail below, are disposed within a single plane 30.

Figure 2:
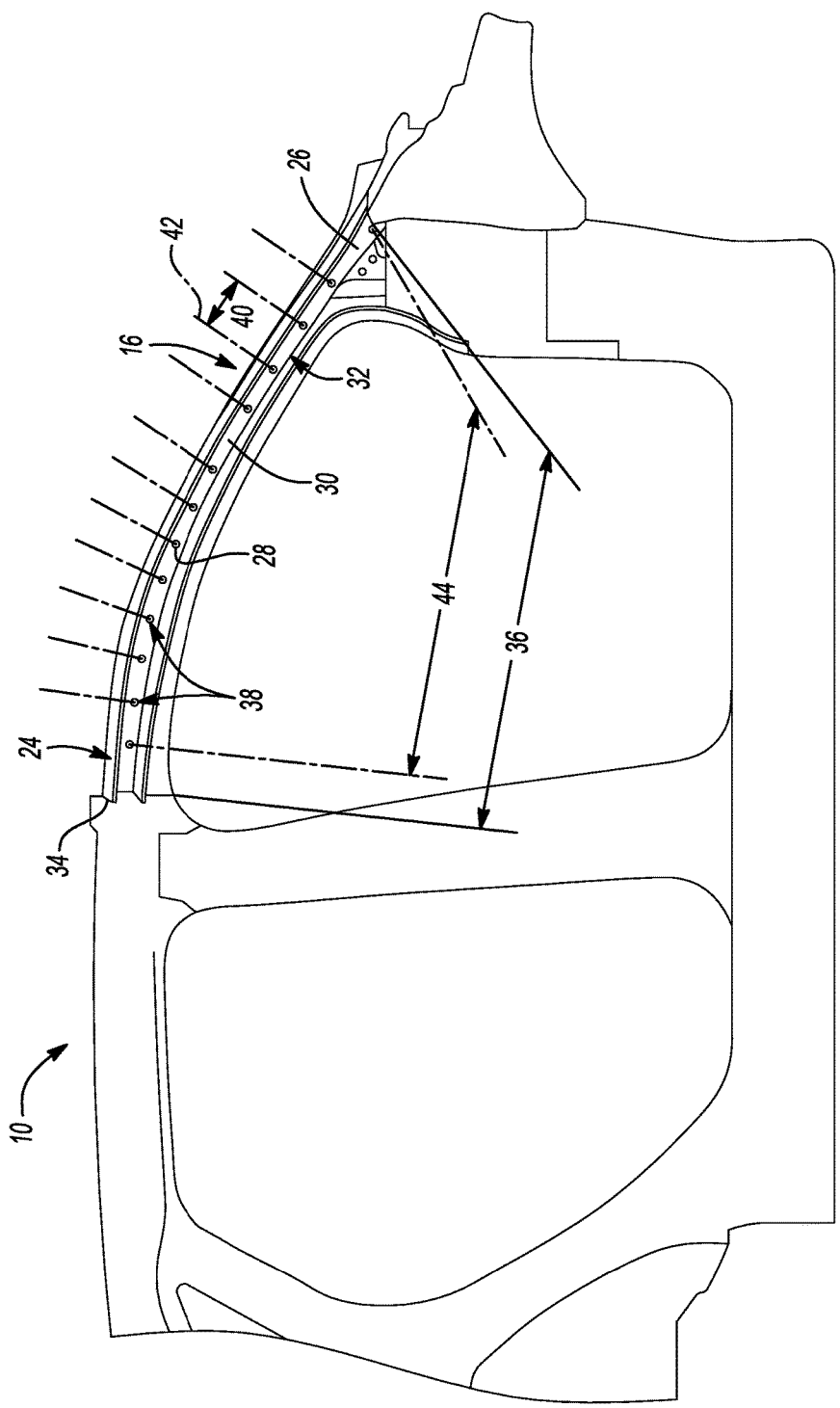
FIG. 2 is a side view of the structural pillars for the vehicle.

Referring to FIG. 2, a side view of the A-pillar 16 having the support 26 welded using the plurality of welds 28 to the C-channel 24 is depicted. The support 26 may be any bar, flange, or wall used to stiffen the A-pillar 16. In at least one embodiment, the support 26 may be a blank formed to match the C-channel 24. For example, the support 26 may define a shape 32 being substantially equal to the C-channel 24. Therefore, the support 26 may define a shape 32 matching the shape of the A-pillar 16, and specifically the C-channel 24 of the A-pillar 16. By matching shapes between the support 26 and the C-channel 24 of the A-pillar 16, the support 26 may be tightly nested within the C-channel 24 on the A-pillar 16. Tight nesting between the support 26 and the C-channel 24 of the A-pillar 16 reduces rattling concerns between the support 26 and the A-pillar 16 that may cause noise, vibrations or harshness felt through the vehicle 10. The tight nesting between the support 26 and the A-pillar 16 provides flexibility to orient the plurality of welds 28 along the C-channel 24 of the A-pillar 16.

The support 26 may be disposed and secured within the C-channel 24 of the A-pillar 16 using the plurality of welds 28. As stated previously, the plurality of welds 28 may be defined within a single plane 30 to account for weld shearing during the stamping of the A-pillar 16. In a similar manner, the support 26 may be disposed within the C-channel 24 such that the support 26 is secured to a first surface 34 of the C-channel 24 by the plurality of welds 28. The support 26 may be configured to only attach to the first surface 34 of the C-channel 24. Again, due to the tight nesting between the support 26 and the C-channel 24, noise, vibrations and harshness are not transferred through the A-pillar 16 due to the plurality of welds 28 being only disposed on support 26 to interconnect the support 26 and the first surface 34 of the C-channel 24. Stated differently, the support 26 may be flush with the first surface 34 of the C-channel 24. The tight nesting between the support 26 and the first surface 34 allows the plurality of welds 28 to be disposed on the single plane 30 sufficiently secure the support 26 to the A-pillar 16.

The support 26 may extend across an entirety 36 of the A-pillar 16. Specifically, the support 26 may extend across the entirety 36 of the C-channel 24 defined on the A-pillar 16. As stated above, the support 26 may be tightly nested with the C-channel 24 such that the support 26 is flush with the first surface 34 of the C-channel 24. Therefore, the support 26 may be flush with the first surface 34 of the C-channel 24 along the entirety 36 of the C-channel 24 defined on the A-pillar 16. Extending the support 26 across the entirety 36 of the C-channel 24 allows a support 26 to provide reinforcement to the A-pillar 16 across the entirety 36 of the A-pillar 16. Providing reinforcement to the A-pillar 16 across the entirety 36 of the A-pillar 16 via the support 26 further adds stiffness and rigidity to the A-pillar 16 to prevent buckling of the A-pillar 16 during vehicle operation. Further, the support 26 accounts for the packaging constraints of the A-pillar 16 by providing reinforcement with only needing to contact the first surface 34 of the C-channel 24 and by securing the support 26 to the first surface 34 of the C-channel 24 using the plurality of welds 28 defined within a single plane 30. Again, using the plurality of welds 28 to secure the support 26 across the entirety 36 of the first surface 34 further provides stiffness and rigidity of the A-pillar 16 in the event of a small overlap rigid barrier impact event.

Since the support 26 may be only secured to the first surface 34 via the plurality of welds 28, the support 26 may be substantially similar to the first surface 34. As stated above, the shape 32 of the support 26 may complement the C-channel 24. In a similar manner, the shape 32 of the support 26 may be substantially C-shaped to fit and nest within the C-channel 24 of the A-pillar 16. In at least one other embodiment, the support 26 may define a shape 32 being a substantially flat, planar sheet metal structure. For example, if the support 26 is a substantially flat and planar sheet metal structure, then the support 26 may only be in contact with the first surface 34. Therefore, the support 26 defines a shape 32 that matches with the first surface 34 of the C-channel 24 defined on the A-pillar 16 to further provide added structural rigidity and stiffness to the A-pillar 16. While described as being substantially flat or C-shaped, the support 26 may define any shape 32 that allows for tight nesting to the A-pillar 16 using a single plane 30 of welds 28, which allows the support 26 to strengthen the A-pillar 16 to improve overall stiffness and rigidity of the vehicle 10.

As will be described in more detail below, the plurality of welds 28 may define an orientation 38 that provides optimal reinforcement via the support 26 of the A-pillar 16. As shown in FIG. 2, the plurality of welds 28 is disposed at regular intervals 40 across the entirety 36 of the first surface 34 of the A-pillar 16. The intervals 40 are defined from central axes 42 of each of the welds 28. When the welds 28 are disposed at regular intervals 40 across the entirety 36 of the first surface 34, the welds are disposed at an equal distance from each of the axes 42 of each of the welds 28. Securing the support 26 to the first surface 34 using the plurality of welds 28 at regular intervals 40 provides even distribution across the support 26 and therefore the A-pillar 16. For example, by securing the support 26 to the first surface 34 using welds 28 at regular intervals 40 across the entirety 36 of the first surface 34, loads may be distributed evenly throughout the A-pillar 16 without sharing of the welds 28 or buckling of the support 26. Therefore, the orientation 38 of the welds 28 allows a support 26 to provide the added structural rigidity of the A-pillar 16 to distribute loads from a small overlap rigid barrier impact event evenly across the A-pillar 16 to further reduce intrusion of the A-pillar 16 into the vehicle 10.

Figure 3:
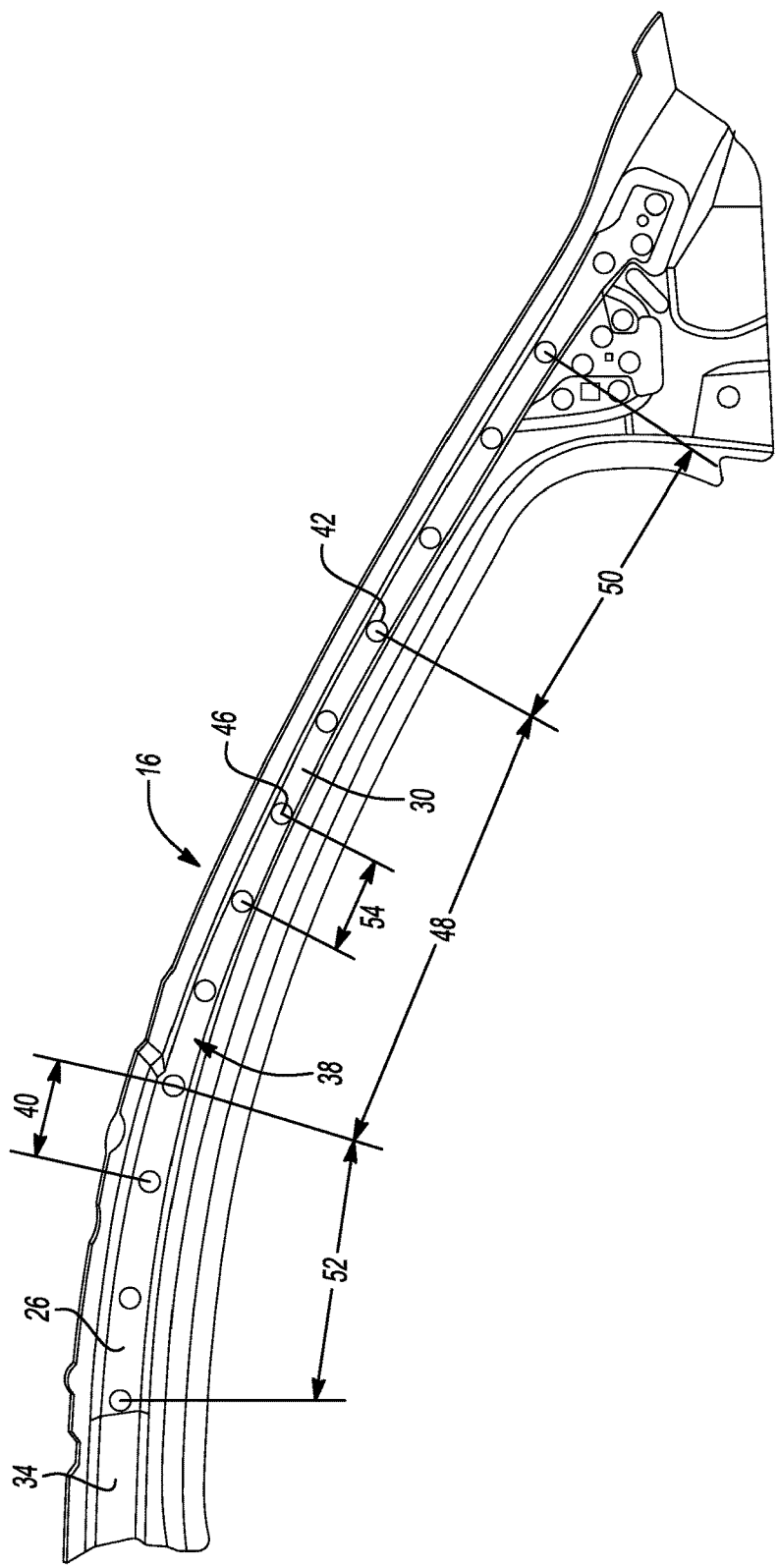
FIG. 3 is a perspective view of an A-pillar having a support attached to the A-pillar.

FIG. 3 depicts a perspective view of the support 26 attached to the first surface 34 of the A-pillar 16 using another orientation 38 of the plurality of welds 28. As stated above, the welds 28 may define an orientation 38 such that the A-pillar 16 achieves an optimal stiffness and rigidity to distribute loads throughout the vehicle 10 and to reduce intrusion into the vehicle 10. The welds 28 may be used anywhere within the single plane 30 to interconnect the support 26 and the first surface 34 of the C-channel 24 defined on the A-pillar 16. For example, to account for various loading characteristics, the welds 28 may be configured to secure the support 28 to the first surface 34 in any orientation 38 necessary to provide added stiffness to the A-pillar 16. As will be described in more detail below, the orientation 38 of the plurality of welds 28 may be such that the intervals 40 between central axes 42 vary across the entirety 36 of the first surface 34.

For example, as depicted in FIG. 2, the orientation 38 of the plurality of welds 28 may be such that the plurality of welds defines a section 44. In the example shown in FIG. 2, the plurality of welds 28 defines a single section 44 disposed across the entirety 36 of the first surface 34. In at least one other embodiment, the plurality of welds 28 may define more than one section 44. Multiple sections may be used across the entirety 36 of the first surface 34 based on the loading characteristics described above. For instance, if during an impact event, the A-pillar 16 experiences more compression at the front and rear of the A-pillar 16, then multiple sections 44 may be used at those locations to provide added stiffness to the A-pillar 16 at those locations. Further, the plurality of welds 28 may define a specific number of welds 28. In the example given, more welds 28 may be added to the sections 44 defined at the front and rear of the A-pillar 16 to provide further stiffness and rigidity to those areas of the A-pillar 16. As will be described in more detail below, the number of welds 28 may also vary based on the orientation 28 of the plurality of welds 28.

The orientation of welds 28 depicted in FIG. 3 shows the above detail. The plurality of welds 28 may further define a point 46. The point 46 may be the starting location for optimization of the plurality of welds 28 disposed across the first surface 34 of the A-pillar 16. The point 46 may also be referred to as the starting point 46 when determining the orientation 38 of the plurality of welds 28. The starting point 46 may be defined anywhere along the entirety 36 of the first surface 34 of the A-pillar 16. For example, the point 46 may be defined at a central portion 48, a first portion 50 or a second portion 52. The point 46 may be aligned with an axis 42 of an individual weld 28 such that a distance 54 defined between each of the welds 28 may be dimensioned from the point 46. Likewise, aligning the point 46 with the axis 42 of an individual weld 28 further defines the number of welds 28 defined within the plurality of welds 28.

For example, the point 46, and therefore a weld 28, may be defined at the central portion 48 of the A-pillar 16. The orientation 38 of the plurality of welds 28 may be such that the distance 54 between welds 28, defined from the central axis 42 of each weld 28, increases from the point 46 defined on the first surface 34 as the welds 28 attach the support 26 to the first surface 34 away from the point 46. In a similar manner, the orientation 38 of the plurality of welds 28 may be such that the distance 54 between welds 28, defined from the central axis 42 of each weld 28, decreases from the point 46 defined on the first surface 34 as the welds 28 attach the support 26 to the first surface 34 away from the point 46. As stated above, the point 46 may also aid in defining the number of welds 28 within the plurality of welds 28. For example, the point 46 may be defined such that the number of welds 28 decreases along the first surface 34 away from the point 46 based on the loading characteristics and the required stiffness of the A-pillar 16. In a similar manner, the point 46 may be defined such that the number of welds 28 increases along the first surface 34 away from the point 46 based on the loading characteristics and the required stiffness of the A-pillar 16.

Again, the point 46 may be defined at any of the central portion 48, first portion 50 or second portion 52 of the A-pillar 16 and define the orientation 38 and number of welds 28 as described above. The point 46 may be defined at any location on the first surface 34 of the C-channel 24 based on the stiffness requirements of the A-pillar 16. For example, in the event of a small overlap rigid barrier impact event, the point 46 may be defined at the central portion 48 such that the orientation 38 of the welds 28 defines a single section 44 extending across the entirety 36 of the first surface 34, wherein the distance 54 between each of the welds 28 is equal. This allows the point 46 to be defined in order to allow the support 26 to stiffen the A-pillar 16 to account for a variety of impact events.

If, however, more load is absorbed at the first portion 50 of the A-pillar 16, the point 46 may be defined at the first portion 50 such that the orientation 38 of the welds defines multiple sections 44 extending across the entirety 36 of the first surface 34, wherein the distance 54 between each of the welds 28 varies as the welds move away from the first portion. Likewise, if more load is absorbed at the second portion 52 of the A-pillar 16, the point 46 may be defined at the second portion 52 such that the orientation 38 of the welds defines multiple sections 44 extending across the entirety 36 of the first surface 34, wherein the distance 54 between each of the welds 38 varies as the welds 28 move away from the second portion. Again, the point 46 defines the orientation 38 and distance 54 between each of the welds 28 and may be defined along the first surface 34 to allow for a sufficient number of welds 28 to provide stiffness and rigidity, via the support 26, of the A-pillar 16 based on the loading characteristics of the A-pillar 16.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a body including an A-pillar having a first surface defining a C-channel; and
   a support disposed on the body, aligned and in contact with the C-channel such that the support defines a shape that matches a shape of the first surface and extends along an entirety of the first surface, wherein the support is attached to the A-pillar via pre-forming spot welds defining an orientation such that a distance between welds, defined from a central axis of each weld, increases from a point defined on the first surface as the welds attach the support to the first surface away from the point along the entirety of the first surface within a single plane being parallel to the first surface.

2. The vehicle of claim 1, wherein the welds are formed at regular intervals along the entirety of the first surface.

3. The vehicle of claim 1, wherein the welds are formed starting at the point on the first surface such that the support increases stiffness of the first surface.

4. A body for a vehicle comprising:
   an A-pillar defining a C-channel along a first surface of the A-pillar; and a support disposed within the C-channel and defining a shape matching the C-channel to mate the support along an entirety of the first surface via pre-formed spot welds aligned with, and formed on the first surface starting at a point such that the welds are defined along a single plane being parallel to the first surface in a number of welds to stiffen the A-pillar at the point such that the number of welds decreases along the first surface away from the point, wherein the welds are spaced to secure the support within the C-channel to form flush contact between the support and the first surface.

5. The body of claim 4, wherein the point is defined based on an interconnection between the support and the first surface such that the support stiffens the first surface of the A-pillar.

6. The body of claim 4, wherein the welds are disposed in sections across the first surface.

7. The body of claim 4, wherein the welds define at least one section across the first surface.

8. The body of claim 6, wherein the sections of welds are defined such that the support maintains flush contact with the first surface of the A-pillar.

\* \* \* \* \*